United States Patent [19]

Kawaguchi

[11] Patent Number: 5,108,138
[45] Date of Patent: Apr. 28, 1992

[54] BUMPER STRUCTURE

[75] Inventor: Yasuhiko Kawaguchi, Nagasaki, Japan

[73] Assignee: Nissan Motor Co., Ltd., Yokohama, Japan

[21] Appl. No.: 729,280

[22] Filed: Jul. 12, 1991

[30] Foreign Application Priority Data

Jul. 12, 1990 [JP] Japan ................................ 2-184674

[51] Int. Cl.⁵ .................................................. B60R 19/04
[52] U.S. Cl. ..................................... 293/120; 293/155
[58] Field of Search ......................... 293/120, 121, 155

[56] References Cited

U.S. PATENT DOCUMENTS 4,474,395 10/1984 Marloff et al. ...................... 293/120
4,830,416 5/1989 Matsuoka ......................... 293/121 X

FOREIGN PATENT DOCUMENTS

| 2702691 | 7/1978 | Fed. Rep. of Germany | 293/155 |
| 2934458 | 3/1981 | Fed. Rep. of Germany | 293/121 |
| 2943461 | 5/1981 | Fed. Rep. of Germany | 293/120 |
| 156845 | 9/1984 | Japan | 293/121 |
| 62-131954 | 8/1987 | Japan | . |
| 2-299947 | 12/1990 | Japan | 293/120 |

Primary Examiner—Margaret A. Focarino
Assistant Examiner—Gary C. Hoge
Attorney, Agent, or Firm—Pennie & Edmonds

[57] ABSTRACT

A bumper structure for a vehicle includes a bumper reinforce secured to a body of the vehicle and a bumper fascia extending along and covering the bumper reinforce. The bumper reinforce has a front vertical wall portion having a first opening, a horizontal upper wall portion and a horizontal bottom wall portion. A first flange extends from an edge of the first opening toward the body and has an engaging portion which is bent toward the first opening. A second flange extends from the edge of the first opening toward the body and is spaced from the first flange to have a certain space therebetween. A third flange extends from the bumper fascia toward the bumper reinforce, and in so sized as to be inserted into the first opening and to be tightly interposed between the first and second flanges. The third flange has a second opening for receiving therein the engaging portion of the first flange. A fourth flange extends from the bumper fascia toward the bumper reinforce and is so sized as to be in abutment with the front vertical wall portion of the bumper reinforce when the third flange is inserted into the first opening until the second opening receives the engaging portion.

16 Claims, 2 Drawing Sheets

BUMPER STRUCTURE

BACKGROUND OF THE INVENTION

1. Field of the Invention

The present invention relates in general to a bumper structure of a motor vehicle, and more particularly to a bumper structure including a bumper fascia.

2. Description of the Prior Art

Some light duty motor vehicles are equipped with bumper structures of a type having a plastic bumper fascia. In order to clarify the task of the present invention, one conventional bumper structure of this type will be outlined with reference to FIG. 3 of the accompanying drawings.

As is seen from FIG. 3, a bumper reinforce 10, having a generally channel structure, extends laterally along and is secured to a front portion of a vehicle body (not shown). A bumper fascia 14 extends along and covers the bumper reinforce 10.

The bumper reinforce 10 has a front vertical wall portion 16, a sloped upper wall portion 18 and a horizontal bottom wall portion 20 which are united to constitute the channel structure. The front vertical wall portion 16 has a through opening 22. The sloped upper wall portion 18 is formed at a rear end portion thereof with a forwardly bent portion 24. The horizontal bottom wall portion 20 is formed with a through hole (no numeral).

The bumper fascia 14 is formed at an upper rear end portion thereof with a grooved portion 26 for fixedly receiving therein the forwardly bent portion 24 of the bumper reinforce 10. The bumper fascia 14 has at a front end portion thereof a projection 28 which is rearwardly and horizontally extended. The projection 28 has a rear end portion which is so shaped and sized as to be thrust into the through opening 22 of the bumper reinforce 10. The bumper fascia 14 has a flange 30 below the projection 28 which flange 30 extends rearwardly and laterally along the bottom wall portion 20 of the bumper reinforce 10. The flange 30 has a through hole (no numeral) which is to be mated with the through hole of the bottom wall portion 20 of the bumper reinforce 10.

The procedure for mounting the bumper fascia 14 onto the bumper reinforce 10 is described as follows.

First, the projection 28 of the bumper fascia 14 is thrust into the through opening 22 of the bumper reinforce 10. Then, the grooved portion 26 of the bumper fascia 14 is engaged with the forwardly bent portion 24 of the bumper reinforce 10. Then, the upper surface of the flange 30 of the bumper fascia 14 is placed on the bottom surface of the bottom wall portion 20 of the bumper reinforce 10 in a manner to align the through hole of the flange 30 with the through hole of the bottom wall portion 20. Then, a pin 32 is thrust into the through holes thereby fixedly connecting the flange 30 of the bumper fascia 14 to the bottom wall portion 20 of the bumper reinforce 10. Thus, the bumper fascia 14 is securely fastened to the bumper reinforce 10.

However, the bumper structure of the above-mentioned type has the following drawbacks.

The projection 28 of the bumper fascia 14 must be large in size relative to a bumper fascia proper so as to achieve a tight connection of the bumper fascia 14 to the bumper reinforce 10. Thus, upon molding, an undesired depression tends to appear at a portion on the front surface of the bumper fascia 14 where a root portion of the projection 28 is provided, thereby lowering the external appearance of the bumper fascia 14. To prevent the occurrence of depression, a so-called character line (viz., a decorative groove) may be provided on the front surface of the bumper fascia 14 in a manner to extend laterally and to pass through the portion where the root portion of the projection 28 is provided. However, in this case, the positioning of the character line is strictly limited. Furthermore, the character line must be so sized as to prevent depression. Thus, the character line can not be omitted from the bumper fascia 14, and the design of the bumper fascia 14 is strictly limited.

Furthermore, due to the shape of the projection 28 of the bumper fascia 14 as being swollen at its rear end portion, a sliding mold must be used for molding the bumper fascia 14, thereby increasing the cost for producing the bumper fascia 14.

SUMMARY OF THE INVENTION

It is therefore an object of the present invention to provide a bumper structure of which bumper fascia has a smooth front surface.

According to the present invention, an undesired depression is not produced or at least minimized on the front surface of the bumper fascia during the molding process of the bumper fascia.

According to the present invention, it is not necessary to use a sliding mold for molding the bumper fascia thereby lowering the production cost.

According to the present invention, there is provided a bumper structure for a vehicle, comprising: a bumper reinforce secured to a body of the vehicle, the bumper reinforce having a first opening; a first flange extending from an edge of the first opening toward the body, the first flange having an engaging portion which is bent toward the first opening; a second flange extending from the edge of the first opening toward the body, the second flange being spaced from the first flange to have a certain space therebetween; a bumper fascia extending along and covering the bumper reinforce; a third flange extending from the bumper fascia toward the bumper reinforce, the third flange being so sized as to be inserted into the first opening and to be tightly interposed between the first and second flanges, the third flange having a second opening for receiving therein the engaging portion of the first flange; and a fourth flange extending from the bumper fascia toward the bumper reinforce, the fourth flange being so sized as to be in abutment with the bumper reinforce when the second opening receives the engaging portion after the third flange is inserted into the first opening.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
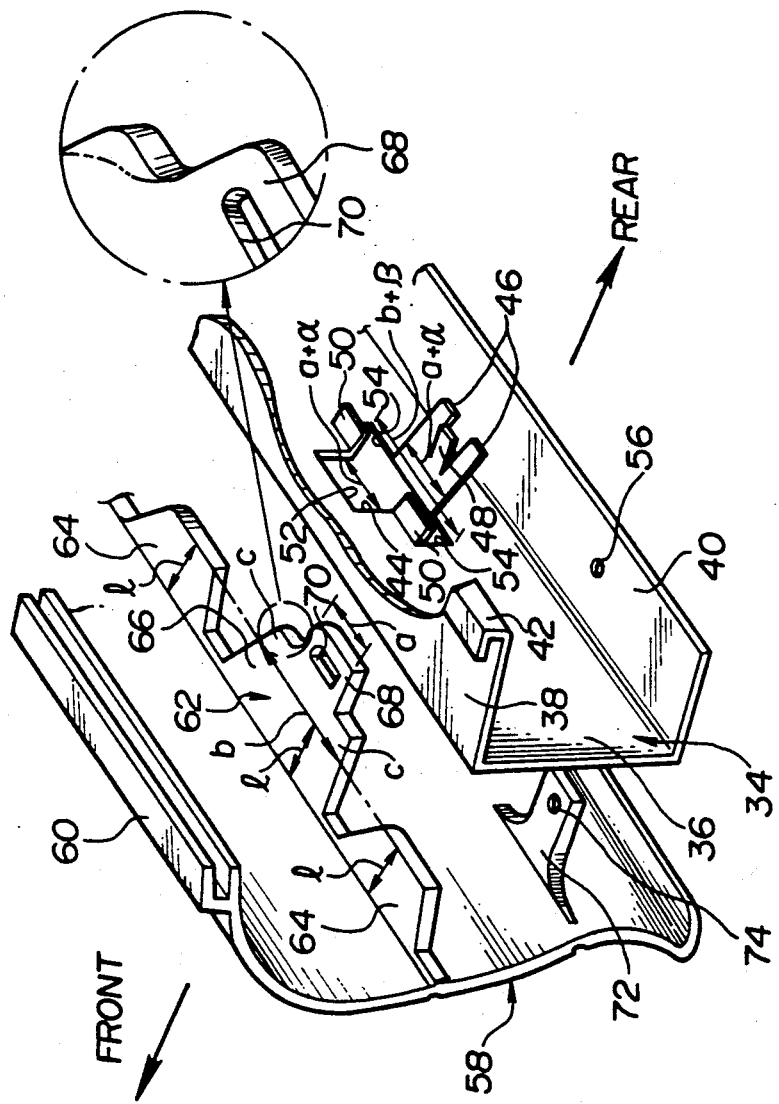
FIG. 1 is a perspective view of a bumper structure, showing a condition wherein a bumper fascia is separated from a bumper reinforce.
Figure 2:
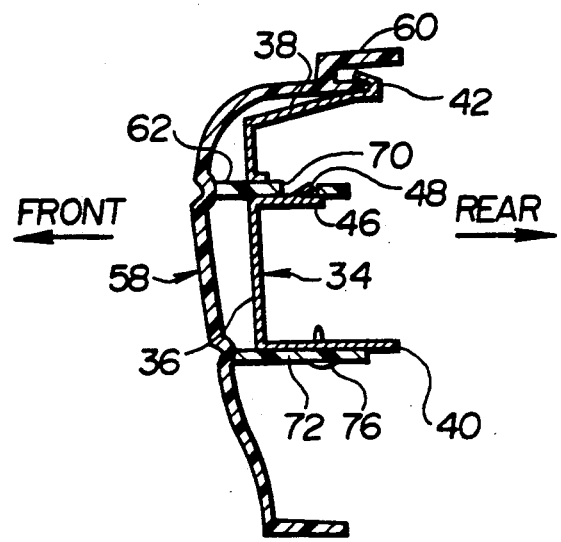
FIG. 2 is a vertically sectional view of the bumper structure, showing a condition wherein the bumper fascia is fixedly connected to the bumper reinforce.
Figure 3:
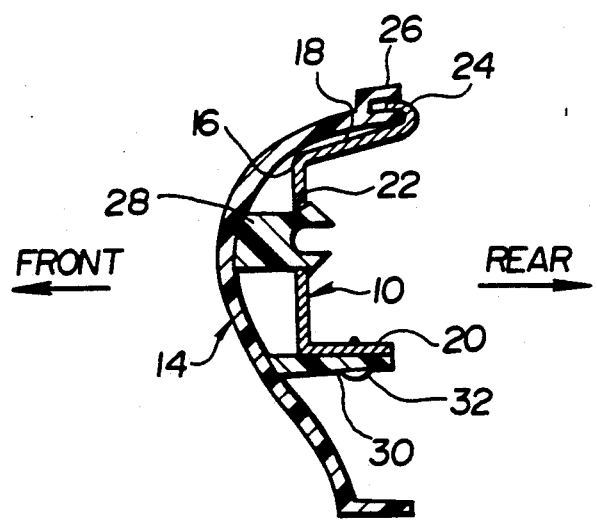
FIG. 3 is a view similar to FIG. 2, but showing a conventional bumper structure.

Referring to FIGS. 1 and 2, there is shown a bumper structure of the present invention.

Referring to FIG. 1, a bumper reinforce 34 of the present invention, which is made of a rigid metal sheet, is secured to a vehicle body (not shown) through two spaced bumper stays (not shown). The bumper stays extend forward from a front portion of the vehicle body. The bumper reinforce 34 extends laterally along the front portion of the vehicle body.

The bumper reinforce 34, having a generally channel structure, has a front vertical wall portion 36, a horizontal upper wall portion 38 and a horizontal bottom wall portion 40. The upper wall portion 38 has at its rear end portion a forwardly bent portion 42. The front vertical wall portion 36 has an inversely T-shaped opening 44, two rearwardly horizontally projected flanges 46, a sloped engaging portion 48 which is provided between the flanges 46 and two rearwardly horizontally projected flanges 50. The flanges 46 and the engaging portion 48 are formed by cutting and rearwardly downwardly bending a larger rectangular portion of the front vertical wall portion 36 and by upwardly bending the engaging portion 48 by a press machine (not shown). The flanges 50 are formed by cutting and rearwardly upwardly bending two smaller rectangular portions of the front vertical wall portion 36 by the press machine. Thus, the opening 44 consists of a larger rectangular opening 52 which is defined by the provision of the flanges 46 and the engaging portion 48 and two smaller rectangular openings 54 which are defined by the provision of the flanges 50. The smaller openings 54 are positioned laterally beside a lower portion of the larger opening 52. The bottom wall portion 40 of the bumper reinforce 34 has a circular through hole 56.

A plastic bumper fascia 58 extends laterally along and covers the bumper reinforce 34. The bumper fascia 58 is formed at an upper rear end portion with a grooved portion 60 for fixedly receiving therein the forwardly bent portion 42 of the bumper reinforce 34. The bumper fascia 58 is formed at a laterally extending middle portion with a larger platelike flange 62 and two smaller platelike flanges 64 which are positioned laterally beside the larger flange 62. The larger flange 62 has a larger base portion 66 of which shape is an isosceles trapezoid and a rectangular smaller portion 68 which has a rectangular opening 70 formed therethrough. The larger base portion 66 has four sides consisting of a base side (no numeral) along the bumper fascia 58, two sides (no numerals) which are the same in length and extend from the bumper fascia 58 toward the bumper reinforce 34 and a side (no numeral) which is positioned away from the bumper fascia 58. Each base angle defined between the base side and one of the two sides is acute. The rectangular opening 70 is so sized as to receive the engaging portion 48 of the bumper reinforce 34 and so positioned relative to the rear vertical surfaces of the smaller flanges 64 that, when the rectangular opening 70 receives the engaging portion 48 after the larger flange 62 is inserted into the opening 44 of the bumper reinforce 34, the rear vertical surfaces of the smaller flanges 64 are brought into abutment with a front surface of the front vertical wall portion 36 of the bumper reinforce 34.

Assuming that lengths of the smaller flanges 64 which are defined perpendicularly to a bumper fascia proper are "l", and a width of the larger flange 62 at a position where the distance from the rear surface of the bumper fascia 58 is "l" is "b", the aforementioned opening 44 of the bumper reinforce 34 is so made as to have at its lower portion a width of "$b+\beta$" which is slightly longer than "b". Therefore, the larger flange 62 of the bumper fascia 58 can be smoothly inserted into the opening 44 of the bumper reinforce 34 until the opening 70 of the bumper fascia 58 receives the engaging portion 48 of the bumper reinforce 34 and the smaller flanges 64 of the bumper fascia 58 are brought into abutment with the front surface of the bumper reinforce 34.

Assuming that the width of the smaller portion 68 of the larger flange 62 of the bumper fascia 58 which is defined along the bumper fascia proper is "a", the flanges 46 and the engaging portion 48 of the bumper reinforce 34 are so made as to have their total width of "$a+\alpha$" which is longer than the width of "a". Therefore, when the larger flange 62 of the bumper fascia 58 is inserted into the opening 44 of the bumper reinforce 34, the smaller portion 68 of the larger flange 62 is stably horizontally placed on the flanges 46 of the bumper reinforce 34.

The thickness of the larger flange 62 which is vertically defined is so sized as to be smoothly inserted into the lower portion of the opening 44 and to be tightly interposed between the flanges 46 and the flanges 50 of the bumper reinforce 34 (see FIG. 2).

Two corner portions "C" of the larger portion 66 of the larger flange 62 are made to be angular. However, if desired, the angled corner portions "C" can be rounded off, as shown by a dotted line of an enlarged larger flange which is partially shown in a circle of FIG. 1. This permits the larger flange 62 to be smoothly inserted into a proper position even when, during the insertion, one of the two corner portions "C" abuts against a side end of the lower portion of the opening 44.

The bumper fascia 58 has a flange 72 which is rearwardly and horizontally extended and positioned below the larger flange 62 and the smaller flanges 64. The flange 72 has a circular through hole 74 which is to be mated with the hole 56 of the bumper reinforce 34.

The procedure for mounting the bumper fascia 58 onto the bumper reinforce 34 is described as follows.

First, the larger flange 62 of the bumper fascia 58 is inserted into the lower portion of the opening 44 of the bumper reinforce 34 until the opening 70 of the larger flange 62 receives the engaging portion 48 of the bumper reinforce 34. Upon this, the rear vertical surfaces of the smaller flanges 64 are brought into abutment with the front surface of the front vertical wall portion 36 of the bumper reinforce 34. When the smaller portion 68 of the larger flange 62 is slid on the engaging portion 48 during the insertion of the larger flange 62 into the opening 44, the smaller portion 68 is flexed upwardly, thereby obtaining smooth insertion of the larger flange 62. Due to the provision of the flanges 46 and 50, a rear end portion of the larger base portion 66 is horizontally inserted into the opening 44 and tightly interposed between the flanges 46 and the flanges 50 of the bumper reinforce 34. Then, the grooved portion 60 of the bumper fascia 58 is tightly engaged with the forwardly bent portion 42 of the bumper reinforce 34. Then, an upper surface of the flange 72 of the bumper fascia 58 is placed on a bottom surface of the bottom wall portion 40 of the bumper reinforce 34 in a manner to align the circular hole 74 with the circular hole 56. Then, a pin 76 is thrust into the circular holes 74 and 56 to fixedly connect the flange 72 and the bottom wall portion 40. Thus, the bumper fascia 58 is fixedly connected to the bumper reinforce 34.

Advantages of the above-mentioned construction of the present invention will be described in the following.

As compared with the projection 28 of the conventional bumper fascia 14, the larger flange 62 and the smaller flanges 64 of the bumper fascia 58 of the present invention can be much reduced in thickness, thereby preventing or at least minimizing the occurrence of depression on the front surface of the bumper fascia 58 during a molding process. Thus, the external appearance of the motor vehicle is considerably enhanced.

Since the flanges 62 and 64 are flat in shape, a sliding mold is not needed, thereby lowering the production cost as compared with the conventional bumper structure.

What is claimed is:

1. A bumper structure for a vehicle, comprising:
 a bumper reinforce secured to a body of said vehicle, said bumper reinforce having a first opening;
 a first flange extending from an edge of said first opening toward said body, said first flange having an engaging portion which is bent toward said first opening;
 a second flange extending from said edge of said first opening toward said body, said second flange being spaced from said first flange to have a certain space therebetween;
 a bumper fascia extending along and covering said bumper reinforce;
 a third flange extending from said bumper fascia toward said bumper reinforce, said third flange being so sized as to be inserted into said first opening and to be tightly interposed between said first and second flanges, said third flange having a second opening for receiving therein said engaging portion of said first flange; and
 a fourth flange extending from said bumper fascia toward said bumper reinforce, said fourth flange being so sized as to be in abutment with said bumper reinforce when said second opening receives said engaging portion after said third flange is inserted into said first opening.

2. A bumper structure as claimed in claim 1, in which said bumper reinforce is made of a rigid metal sheet and has a front vertical wall portion having said first opening, a horizontal upper wall portion and a horizontal bottom wall portion.

3. A bumper structure as claimed in claim 1, further comprising a fifth flange extending from said edge of said first opening toward said body, said fifth flange being positioned away from said first and second flanges, said fifth flange being flush with said second flange, said first flange except said engaging portion thereof being parallel to said second and fifth flanges thereby tightly interposing said third flange therebetween.

4. A bumper structure as claimed in claim 3, in which said first, second and fifth flanges are provided by cutting and bending said front vertical wall portion of said bumper reinforce by means of a press machine thereby defining said first opening.

5. A bumper structure as claimed in claim 4, in which said first opening comprises a larger rectangular portion defined by said first flange and two smaller rectangular portions defined by said second and fifth flanges, said smaller rectangular portions interposing said larger rectangular portion therebetween.

6. A bumper structure as claimed in claim 1, in which said third flange includes a larger base portion and a smaller portion which is formed with said second opening.

7. A bumper structure as claimed in claim 6, in which said larger base portion is generally quadrilateral in shape, in which said larger base portion has four sides consisting of a base side along said bumper fascia, two first sides which extend from said bumper fascia toward said bumper reinforce and a second side which is positioned away from said bumper fascia, and in which each base angle defined between said base side and one of said first sides is acute.

8. A bumper fascia as claimed in claim 7, in which each corner portion defined between said second side and one of said first sides is rounded off so that said larger base portion can be smoothly inserted into a proper position even when, during the insertion, one of said corner portions abuts against one of side ends of said smaller rectangular portions.

9. A bumper structure as claimed in claim 8, in which said larger base portion is generally trapezoidal in shape, and in which said first sides are the same in length.

10. A bumper structure as claimed in claim 6, in which said smaller portion is generally rectangular in shape, and in which said smaller portion has a first width which is smaller than a second width of said larger rectangular portion, said first and second widths being defined horizontally and along said bumper fascia.

11. A bumper structure as claimed in claim 1, further comprising a sixth flange having the same size and shape as those of said fourth flange, said sixth flange extending from said bumper fascia toward said bumper reinforce, said fourth and sixth flanges interposing therebetween said third flange.

12. A bumper structure as claimed in claim 11, in which said third, fourth and sixth flanges and said bumper fascia are plastic and one-piece in construction.

13. A bumper structure as claimed in claim 6, in which said smaller portion of said third flange is so flexible as to slide on said engaging portion during the insertion of said third flange into said first opening.

14. A bumper structure as claimed in claim 2, in which said horizontal upper wall portion of said bumper reinforce is formed at a rear end portion thereof with a forwardly bent portion, in which said bumper fascia has at an upper rear end portion a grooved portion for receiving therein said forwardly bent portion, and in which said bumper fascia has a seventh flange extending therefrom toward said bumper reinforce, said seventh flange being positioned below said third, fourth and sixth flanges so as to be placed on said horizontal bottom wall portion of said bumper reinforce.

15. A bumper structure as claimed in claim 14, further comprising means for connecting said seventh flange to said horizontal bottom wall portion.

16. A bumper structure as claimed in claim 15, in which said connecting means comprises a pin and means for defining aligned through holes, said aligned through holes being formed through said horizontal bottom wall portion and said seventh flange, said pin being thrust into said aligned through holes.

* * * * *